United States Patent

Feather

[15] 3,688,787
[45] Sept. 5, 1972

[54] LONGITUDINALLY COLLAPSIBLE CANOPY FOR PICKUP TRUCKS AND ANALAGOUS FRAMES

[72] Inventor: Clark B. Feather, 5602 N. 68th St., Omaha, Nebr. 68104

[22] Filed: April 29, 1970

[21] Appl. No.: 32,866

[52] U.S. Cl. ............... 135/7.1 A, 135/1 A, 135/5 A, 296/100, 296/105
[51] Int. Cl. ............................................. E04f 10/02
[58] Field of Search ............. 296/100, 102, 104, 105; 135/1 R, 1 A, 5 R, 5 A, 7.1 R, 7.1 A; 160/172

[56] References Cited

UNITED STATES PATENTS

| | | | |
|---|---|---|---|
| 3,231,305 | 1/1966 | Beckman | 296/100 |
| 3,201,171 | 8/1965 | Wickard | 296/105 X |
| 2,604,158 | 7/1952 | Carpenter et al. | 160/172 |
| 3,363,938 | 1/1968 | Schultz | 296/105 |

Primary Examiner—Benjamin Hersh
Assistant Examiner—Winston H. Douglas
Attorney—George R. Nimmer

[57] ABSTRACT

There is provided a longitudinally collapsible canopy-like covering for longitudinally extending open-top frames, such as for the cargo-box of a pickup truck. The collapsible canopy structure comprises a plurality of substantially parallel arch-like ribs, each rib including a lofty spacer-member extending transversely across the frame member longitudinal axis and a pair of upright leg-members longitudinally movably associatable along the frame member; an elongate strip of flexible crease-resistant drapeable or festoonable sheet material cover is attached at relatively-long intervals to lower portions of the several ribs and is additionally removably attachable at relatively-short intervals with respect to the underlying frame member. Desireable refinements include: rigidly upright adjustable front-panel and rear-panel; a novel resinous internal construction for the sheet-like flexible cover; and transverse alignment means for the longitudinally movable rearmost-rib.

5 Claims, 9 Drawing Figures

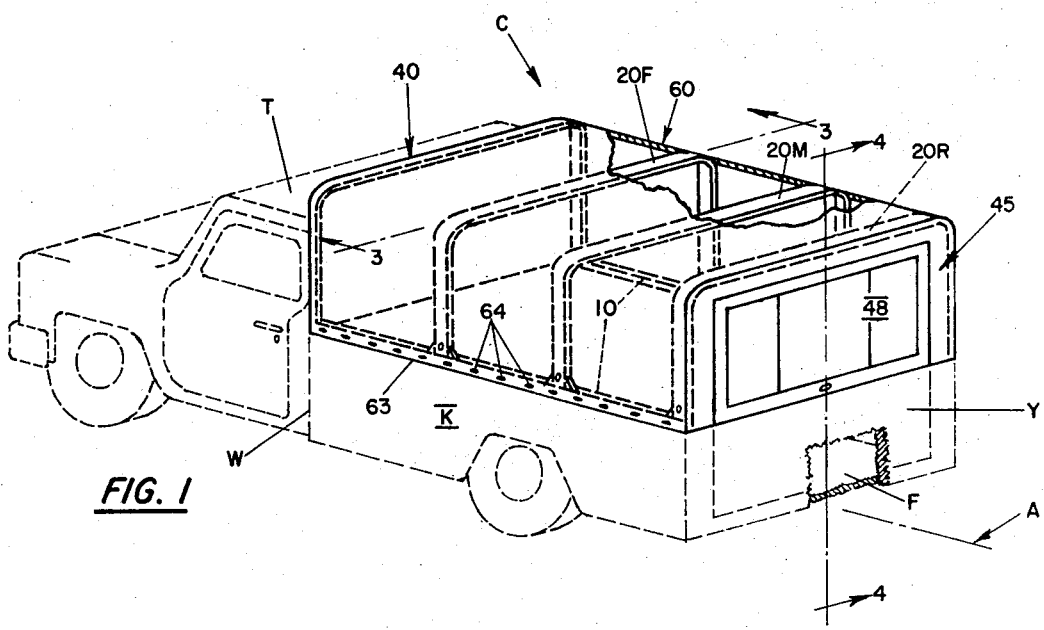
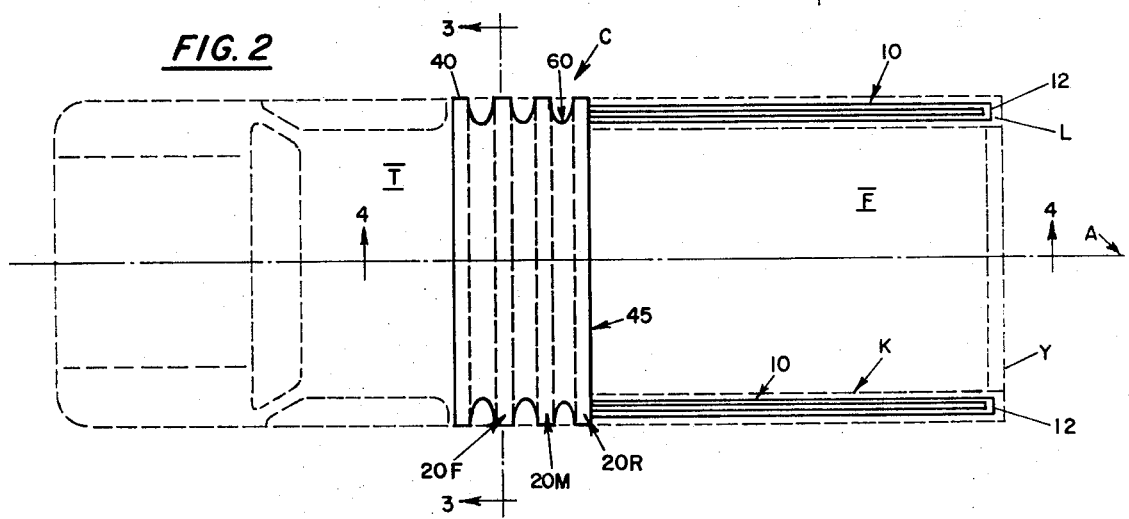
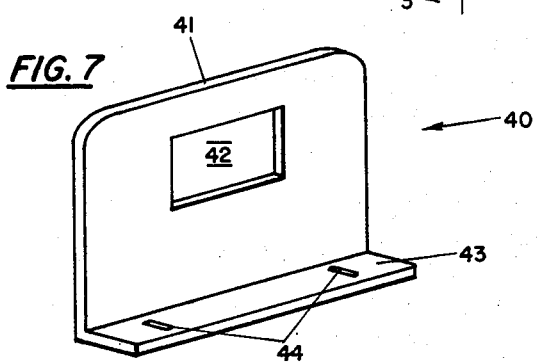
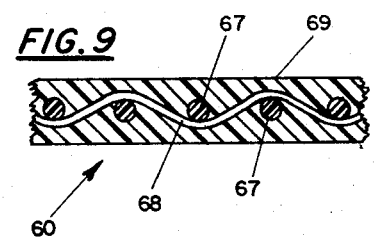
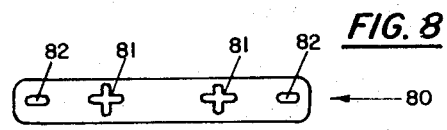
CLARK B. FEATHER
INVENTOR.
BY *George R. Kimmer*
ATTORNEY

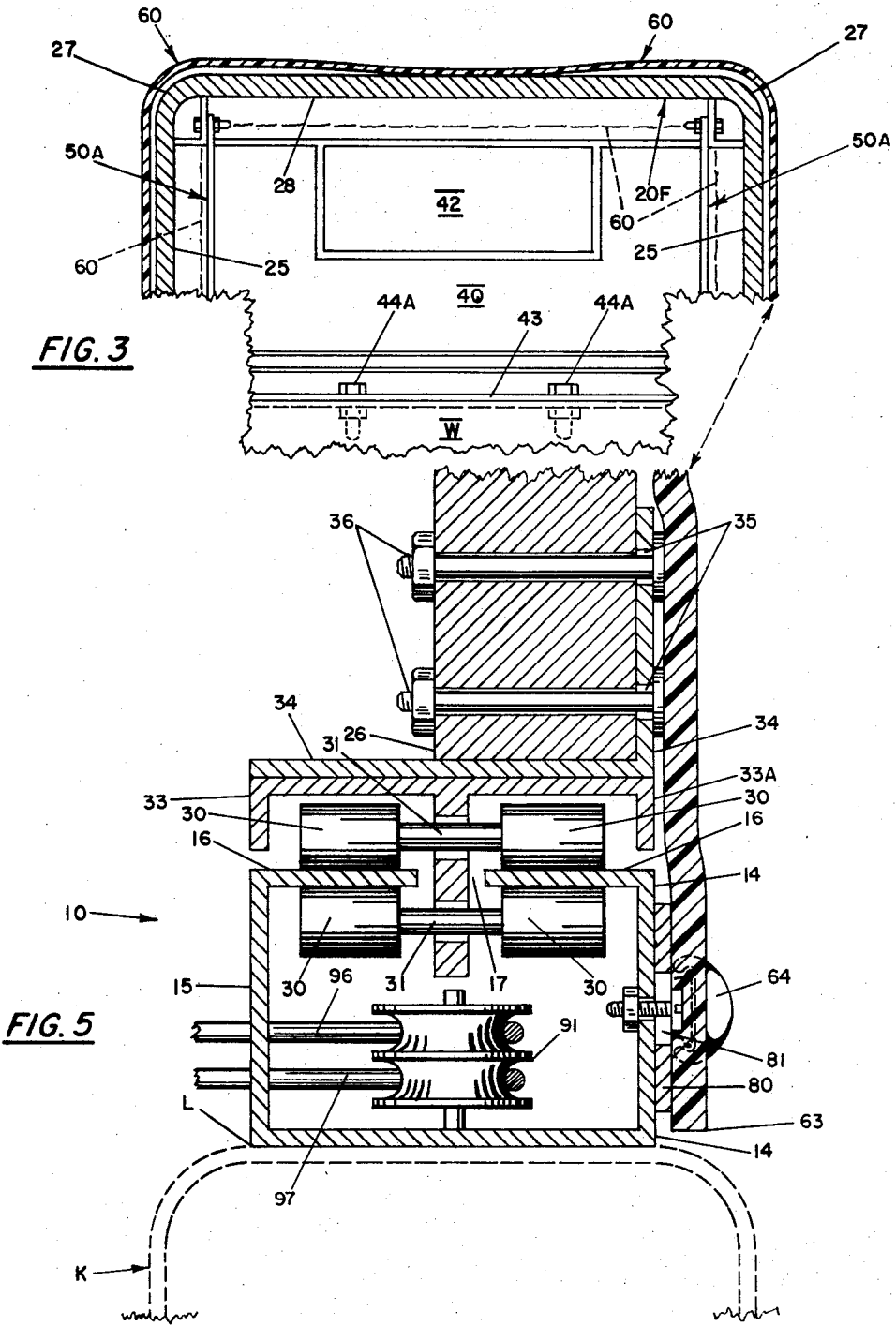

PATENTED SEP 5 1972

CLARK B. FEATHER
INVENTOR.

BY *(signature)*
ATTORNEY

LONGITUDINALLY COLLAPSIBLE CANOPY FOR PICKUP TRUCKS AND ANALAGOUS FRAMES

The prior art generally describes so-called "accordian-type" longitudinally collapsible canopy-like coverings for elongate open-top frames, as for the rearwardly extending cargo-box of a pickup truck. Such "accordian-type" canopy-like coverings typically comprise a plurality of transverse arch-like ribs, usually of an inverted-U transverse configuration, the two upright lower extremities of each rib being longitudinally associated along the respective opposed elongate upright sidewalls of the frame member. Moreover, such prior art canopy structures further comprises an elongate strip of flexible sheet material, such as canvas or the like, attached at relatively long intervals to the several ribs; thus, as the longitudinally movable ribs are crowded closely together, the sheet material drapes or festoons between adjacent ribs to permit the canopy to longitudinally collapse thereby exposing the elongate top of the underlying frame member. However, any of such prior art "accordian-type" collapsible canopy structures suffer from the following deficiencies and disadvantages. First, there is uneven draping of the sheet material between successive ribs whereby the collapsed canopy is of unsightly appearance and attains only partially collapsed form. Second, it is oftentimes difficult and tedious for a long unassisted operator to longitudinally collapse the canopy structure. Third, the sheet material cover member is apt to be structurally weak for the intended purposes, and lacking extended tautness and weather resistance, such that the entire extended canopy tends to be relatively unstable, unsightly, and offering inadequate protection to the frame member contents.

It is accordingly the general object of the present invention to overcome the several disadvantages and deficiencies of prior art "accordian-type" longitudinally collapsible canopy-like covers for elongate frame members.

It is another object of the present invention to provide a longitudinally collapsible cover that lends itself especially well to the environment of a rearwardly extending cargo box of a pickup truck.

It is a further object to provide a collapsible cover that has a high degree of longitudinal collapsibility compared to the longitudinally extended length thereof.

It is yet another object to provide a collapsible canopy that has a high degree of symmetrical wrinkle-free and aesthetic appearance in both the collapsed and extended forms thereof, and that is long lasting, durable, and weather resistant.

It is a further object to provide a collapsible canopy that is of unusual stability and rigidity, that is unusually structurally sound, tight, and weather-resistant, and that is easily manipulated, even by a lone unassisted operator.

With the above and other objects and advantages in view, which will become more apparent as this description proceeds, the longitudinally collapsible canopy (adapted for use in combination with an appropriate frame member having an opposed pair of elongate rigidly-upright sidewalls) generally comprises: a pair of substantially horizontal elongate track means attachable along the respective frame elongate sidewalls; a plurality of arch-like ribs, each rib including two depending free ends longitudinally movably connected along the two respective track means, said ribs including a rearmost-rib, a forwardmost-rib, and at least one intermediate-rib; a cover member as an elongate strip of flexible festoonable sheet material having a forward transverse end rigidly attachable with respect to the frame member forwardly remote of the rearmost-rib and having a rearward transverse end rigidly attachable to the transversely extending spacer-member of the rearmost-rib, said cover member being attached at relatively-long intervals to other ribs at their respective upright portions and additionally temporarily attachable at relatively-short intervals with respect to the respective frame sidewalls between individual arch-like ribs; and transverse alignment means for the rearmost-rib.

In the drawing wherein like characters refer to like parts in the several views, and in which:

FIG. 1 is a perspective view of a representative form of the longitudinally collapsible canopy shown in the fully longitudinally extended form, the frame member chosen herein being the rearwardly extending open-top cargo-box of a pickup truck. Portions of the cover and frame members are broken away to show constructional details.

FIG. 2 is a top plan view of the longitudinally collapsible canopy of FIG. 1, with the canopy being shown in a forwardly collapsed form thereof.

FIG. 3 is a sectional transverse elevational view taken along lines 3—3 of FIGS. 1 and 2, phantom lines being employed to indicate the canopy in the FIG. 2 longitudinally collapsed form.

FIG. 5 is a detail sectional plan view taken along the plane of FIG. 3 to show a longitudinally rollable association between a typical rib and a preferred track means.

FIG. 7 is a detail perspective view of a front-panel member of the preferred embodiment.

FIG. 8 is a plan view of a preferred type attachment means between the cover member and the frame member parallel to the track means.

FIG. 9 is a sectional elevational view on a considerably enlarged scale of the preferred cover member, showing the internal construction thereof.

Figures 4, 6:
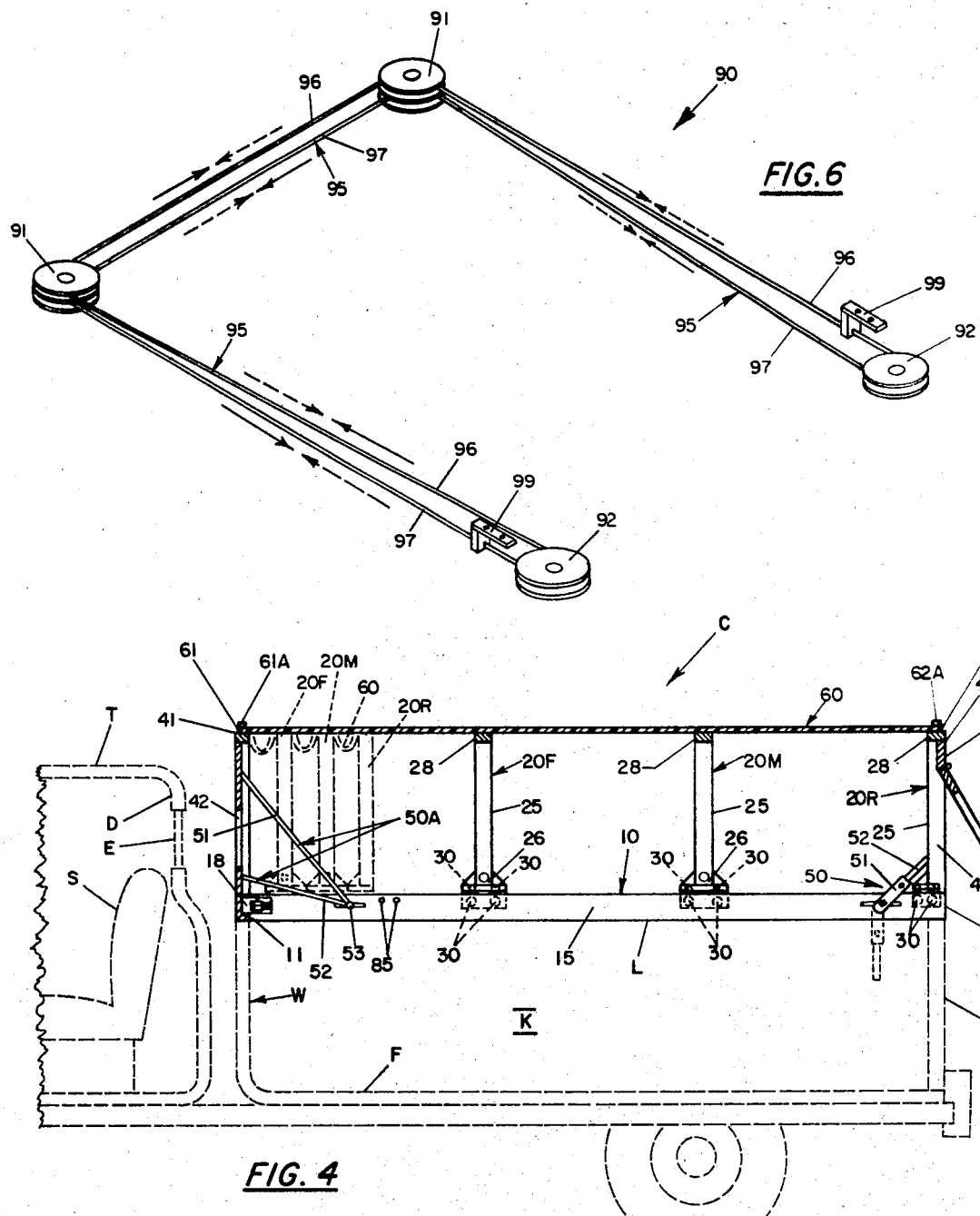
FIG. 4 is a sectional longitudinal elevational view taken along lines 4—4 of FIGS. 1 and 2, phantom lines being employed to indicate the canopy in the FIG. 2 longitudinally collapsed form.
FIG. 6 is a schematic plan view showing a pulleys and cable transverse alignment means for the rearmost-rib.

The longitudinally collapsible canopy "C" generally comprises: a pair of opposed track means, e.g., 10; at least three arch-like ribs, e.g., 20F, 20M, and 20R; and an elongate flexible festoonable sheet material cover member 60.

The underlying frame member for canopy "C" comprises a pair of rigidly-upright opposed elongate sidewalls "K" spaced apart in substantial parallelism on opposite sides of a longitudinal axis "A" whereby a substantially constant transverse distance exists between sidewalls "K." Herein, the respective sidewalls extend rigidly upwardly from a substantially horizontal floor "F." Each of the sidewalls "K" has a substantially horizontal elongate edge "L," said respective upper edges "L" being of substantially common elevation to define a substantially horizontal upper extremity for the frame member. The underlying frame member has a transverse forward end, e.g., at "Y." Such type frame member, including opposed sidewalls "K" having upper edges "L," desireably takes the form of the longitudinally rearwardly extending open-top cargo-box of a conventional pickup truck. Such pickup trucks typically comprise a forwardly positioned operator's cab with a roof "T," an internal cushioned seat "S," an upright cab-wall "D" positioned immediately rearwardly of "S," and normally a transparent window "E" for cab-wall "D." The open-top cargo-box frame member extends longitudinally rearwardly from a cargo-box transverse front-wall "W" (immediately behind "D") and comprises integrally connected elements "K," "F," "W," and normally also a transversely extending rear-wall "Y" (which might be a conventional pivotably attached tail-gate). Elements "K," "W," and "Y" are usually of common elevation at "L."

There is a plurality of longitudinally movable arch-like transversely extending ribs 20, herein specifically as 20F, 20M, and 20R. Each arch-like rib comprises a pair of upwardly extending leg-members and a transversely extending intervening spacer-member rigidly attached to the upper portion of the two respective adjoining leg-members. Each rib, through the two leg-members, is longitudinally movably associated along the frame member upright sidewalls, as through appropriate longitudinally extending track means, e.g., 10. Preferably, each of the several arch-like ribs is geometrically and structurally similar, and thus, the same reference characters will herein apply to components of the individual representative ribs 20F, 20M, and 20R. Each of said representative ribs herein comprises a pair of leg-members 25 extending vertically upwardly from the two respective track means and having a lower portion (nearer to the track means) terminating as a lower free end 26. A horizontal spacer-member 28 extends substantially perpendicular across axis "A" from the curved upper portions 27 of the respective leg-members 25. Both leg-members 25 and the intervening spacer-member 28 are herein provided from a single price of metallic structural material. Thus, each of the three parallel ribs herein is of generally inverted-U shaped configuration with two lower free ends 26 and a lofty transverse spacer-member 28. Preferably, the lofty spacer-member 28 of the several ribs occupy a substantial common horizontal plane of elevation.

The preferred track means for the several arch-like ribs comprises the elongate rail-like tracks 10. The respective rail-like tracks 10 are attached to the respective sidewalls "K" along the upper elongate upper edges "L," whereby a regular finite transverse-distance exists between rails 10. There are transversely aligned forward ends 11 for rails 10 nearer to front-wall "W," and also transversely aligned rearward ends 12 for said rails 10 nearer to rear-wall "Y." Each rail-like track 10 is of substantially regular transverse cross-sectional shape along the length thereof, and includes in transverse shape: a transverse horizontal base plate 13 abuttably attached along edge "L"; an upright outward-side 14 extending integrally upwardly from 13; an upright inward-side 15 extending integrally upwardly from 13 whereby the elongate inward-sides 15 of respective rails 10 face each other; and a pair of converging horizontal lips 16 transversely separated by a spatial gap to provide longitudinal slot 17. As is indicated in FIGS. 4–6, the inward-side 15 of each rail 10 is provided with an opening 18 nearer to the rail forward end 11.

Referring now particularly to FIG. 5, longitudinally movable association between each of the individual ribs 20 and the longitudinally extending track means 10 is preferably a rollable type association, as through several rollers 30. For example, there are two vertically aligned pairs of rollers 30, each roller pair revolvably surrounding a transverse axle 31, the two vertically aligned axles 31 being carried by an upright lug 32 disposed in rail slot 17. Lug 32 integrally depends from a relatively short-length (a few inches) inverted channel-iron 33 which is maintained above rail lips 16 through the upper roller pair, the upright outer-side 33A of the respective channel-irons 33 being in substantial vertical alignment with the respective rails outward-side 14. Attachment of rollers 30 beneath the leg-members lower end 26 is herein accomplished through a relatively short-length member 34 of L-shaped transverse cross-section. The horizontal leg of member 34 is attached (as by welding) to the upper side of longitudinally coextensive channel-iron 33. The upright leg of member 34 (which is inwardly offset of vertically aligned sides 33A and 14) is attached to leg-members 25, as by transverse bolt 36 passing through a vertically slotted portion 35 of member 34. Stably upright rollable association of each rib 20 along the respective rail-like tracks 10 is enhanced through a doubling of the aforedescribed four-rollers structure. Non-sectioning in FIG. 5 for elements 30–32 indicates a doubling of said elements 30–32 in the longitudinal direction, and thus eight rollers 30 and four axles 31 are preferably employed beneath each leg-member lower end 26. In the same vein, the free ends of the several rollers 30 might be rounded to prevent binding along the rail sides 14 and 15.

Thus, it can be seen that each of the individual ribs 20F, 20M, and 20R, is independently rollably longitudinally associated along the spaced-apart parallel track means, e.g., 10, and that irrespective of their individual selected positions along the track means, the forwardmost-rib 20F is always located forwardly of intermediate-rib 20M, and the rearmost-rib 20R is always located rearwardly of 20M. Forwardmost-rib 20F has a forward limit of travel (indicated in phantom line in FIGS. 2 and 4), said forward limit of travel being herein provided through a transversely extending rigidly-upright stationary front-panel 40 attached to the transversely aligned forward ends 11 of the respective tracks 10, herein immediately rearwardly of cab-wall "D." Front-panel 40 has a transverse upper edge 41 which is positioned somewhat higher than cab roof "T" and at substantial co-elevation with the several spacer-members 28. As seen in FIGS. 3, 4, and 7, front-panel 40 has a lower plate 43 with slotted portions 44 parallel to "A," bolts 44A passing through 44 into front-wall "W." There is a transparent window 42 in front-panel 40 horizontally aligned with cab window "E." Rearmost-rib 20R has a rearward limit of travel (indicated in FIG. 1 and in solid line in FIG. 4), said rearward limit of travel being provided by the abrupt rearward terminii of rail slotted portions 17, or alternately, through the rear pulleys 92.

The rear end of the collapsible canopy structure herein is preferably provided with an upright rigid rear-panel 45 that is vertically alignable with the cargo-box frame rearwall "Y" when the canopy is fully longitudinally extended (as indicated in solid line in FIGS. 1 and 4). The rigid rear-panel 45 is attached to the rearward side of rear-rib 20R, said rear-panel 45 including a transverse horizontal upper edge 46 of substantial co-elevation with the several spacer-members 28. Rear-panel 45 is provided with a closeable window-like opening 47 in horizontal alignment with windows 42 and "E" to afford longitudinal vision for an operator within the truck cab at "S." Closure of opening 47 is herein provided with a window-panel 48 that is rearwardly pivotably associated with rear-panel 45, as indicated in FIG. 4. To help assure tautness of flexible cover member 60, there is a brace member, e.g., 50, adapted to exert rearward pressure against rearmost-rib 20R or rear-panel 45 when rearmost-rib is at its rearward limit of travel. The preferred brace member 50 is of variable-length type alluded to in FIG. 4, and herein comprises a tubular main body 51 pivotably attached to the respective rails inward-side 15 near the rearward end 12. A secondary portion 52 is extendable from tubular main body 51 and maintained at the selected extension through a conventional set-screw. The free end of extendable portion 52 is adapted to bear against rear-panel 45; as indicated in phantom line in FIG. 4, the braces 50 are released prepatory to longitudinal collapsing for the canopy structure. Similar brace means as 50A might be employed at front-panel 40 to further longitudinally tighten cover member 60. However, the longitudinally extending slots 44 and bolts 44A at front-panel 40 also ensure tautness of cover member 60.

Cover member 60 comprises a longitudinally extending elongate rectangular strip of a flexible sheet material. The flexible sheet material 60 comprises canvas, rubber, or similarly drapeable or festoonable material, as indicated in phantom lines 60 in FIGS. 2 and 3. The preferred type of sheet material for cover member 60 comprises a woven fabric 67–68 disposed within a structurally continuous resinous matrix 69. The fabric warp threads 67, the fabric woof or filling threads 68, and the impregnated matrix 69 for fabric 67–68, are each provided of substantially identical resinous materials, such as plasticized vinyl resins. The same plasticizer is used in threads 67–68 and in matrix 69, preferably monomeric plasticizers such as tricresyl phosphate, to promote adhesion between fabric 67–68 and matrix 69. With such chemical similarities, there is exceedingly tenacious and compatible bonding such that not only is cover member 60 water repellant, but also durable and stably resistant to wide temperature ranges, to repeated flexural stresses, and to the application of high tensile forces.

Flexible cover 60 includes a forward transverse end 61 which is affixed relatively stationary to the frame member forwardly of the forward limit of travel for forwardmost-rib 20F; specifically herein, cover forward end 61 is rigidly attached (as by vertical fasteners extending through molding strip 61A) into front-panel 40 along upper edge 41. Flexible cover 60 includes a rearward transverse end 62 which is affirmatively attached (as by vertical fasteners extending through molding strip 62A) relative to rearmost-rib 20R (herein along rear-panel upper edge 46). Finally, elongate cover 60 comprises a pair of substantially parallel longitudinally extending edges 63 that lie along the respective outward-sides 14 of track means 10 when the canopy is fully longitudinally extended (as indicated in solid lines in FIGS. 1 and 4). Longitudinally extending lower areas along edges 63 of cover member 60 are permanently attached to each rib, as by bolts 36 passing through the lower portion of leg-members 25 at 35. The said permanent attachment means, e.g., 36, between cover 60 and the leg-members are spaced at relatively-long dimensional intervals (such as the length of edge 63 divided by the number of ribs). Thus, the canopy in the forwardly longitudinally collapsed form (indicated in FIG. 2 and in phantom line in FIGS. 3–4) is free to festoon or drape in accordian-like fashion between each of the several ribs 20. It has been found desireable to leave the cover 60 absolutely free of fasteners or pocket-like encirclements for each spacer-member 28 so as to ensure optimum unrestrained accordian-like drapeable collapsing for cover member 60. Rails 10 might include transverse holes 85 nearer to forward end 11 to removably accomodate pins (not shown) to help maintain the canopy collapsed condition.

There are means to removably attach the cover 60 at relatively-short intervals along edges 63 to the respective frame sidewalls, herein at every few inches along the rails outward-sides 14, during those periods when the canopy is longitudinally extended. The removable attachment means herein comprise conventional snap-type fasteners 64 positioned at regular intervals along edges 63 and mateably removably engageable along outward-sides 14, preferably through the attachment plate 80 of FIG. 8. Attachment plate 80 is vertically and longitudinally adjustably positioned along rails 10 by virtue of slots 81, to further ensure tautness of extended cover member 60.

There are transverse alignment means to maintain rearmost-rib 20R substantially transversely perpendicular to axis "A" as said rib 20R is made to move longitudinally through longitudinally extending forces manually exerted upon only one of the leg-members 26, as is necessitated when there is a lone unassisted operator. As schematically indicated in FIG. 6, and elsewhere in the drawing, the preferred transverse alignment means 90 comprises four longitudinally-stationary horizontal revolvable pulleys together with an endless cable 95 looped therearound in dual strand (96–97) configuration. Two pulleys are as double-grooved front-pulleys 91 disposed inside rails 10 near the front ends 11, whereby both front-pulleys 91 and both sideward openings 18 are transversely aligned. Two pulleys are as transversely aligned single-grooved rear-pulleys 92 disposed inside rails 10 near the rear ends 12. Both leg-members 26 of rearmost-rib 20R are attached to endless cable 95 through connector 99, one connector 99 attached to cable strand 96 and the other connector 99 attached to cable strand 97. Solid arrows in FIG. 6 indicate schematically longitudinal movement of rearmost-rib 20R through connectors 99 when the canopy is extended, while the broken arrows indicate opposite longitudinal movement for collapsing the canopy.

From the foregoing, the construction and operation of the collapsible canopy will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A longitudinally collapsible canopy in combination with a frame member extending along a longitudinal axis, said frame member comprising a pair of rigidly upright opposed elongate sidewalls transversely spaced apart in substantial parallelism on opposite sides of said longitudinal axis, said frame member including a transverse forward end and including a transverse rearward end defined by the sidewalls rearward terminii, each of said sidewalls having a substantially horizontal elongate upper edge of substantially common elevation to define a substantially horizontal upper extremity for the frame member, said longitudinally collapsible canopy comprising:

A. A pair of substantially parallel longitudinally extending track rails attached to the respective frame sidewalls and extending at substantial co-elevation therealong, each of said longitudinally extending track rails including in transverse cross-section a pair of converging transversely-separated horizontal lips;

B. A plurality of arch-like upright ribs, each said rib comprising a pair of upwardly extending leg-members and a transversely extending intervening spacer-member rigidly attached to the upper portion of the two leg-members, the several spacer-members being of substantially constant elevation, the lower portion of the two leg-members for each rib being longitudinally rollably associated along the two respective rails at the convergent lips thereof, said ribs including a relatively rigid rearmost-rib always positioned nearer to the frame rearward end than are the remaining ribs and including a forwardmost-rib having a forward limit of travel;

C. A cover member comprising a longitudinally extending elongate strip of flexible festoonable sheet material having a rearward transverse end attached to the rearmost-rib, said cover member also being attached to the leg-member of each rib; and D. Transverse alignment means to maintain the rearmost-rib substantially transversely perpendicular to the respective parallel rails as said rearmost-rib is caused to travel longitudinally forwardly through longitudinally exerted forces applied to a single leg-member of the rearmost-rib, said transverse alignment means comprising an endless cable attached to the rearmost-rib and looped in dual strand configuration about four horizontal revolvable pulleys having vertical axles located at fixed locations within the two respective rails below the convergent lips thereof, two of said pulleys as transversely aligned double-grooved front-pulleys being attached to the respective rails forwardly of the two similarly transversely aligned rear-pulleys.

2. The canopy combination of claim 1 wherein each rail-like track has two upright longitudinally extending sides including an upright outward-side and including an inward-side whereby the inward-side of the respective rails face each other; wherein for each arch-like rib the two leg-members thereof extend substantially vertically upwardly from the rails outward-side and the intervening spacer-member is substantially horizontal; wherein there is a transversely extending upright rigid front-panel attached to the frame member and permanently positioned forwardly of the forwardmost-rib, said front-panel including a transversely extending upper edge at substantially co-elevation with the spacer-members of several ribs; wherein there is a transversely extending upright rigid rear-panel attached to the rearmost-rib; and wherein the cover member comprises a substantially rectangular elongate strip of flexible festoonable sheet-material including: a transverse forward edge attached along the transverse upper edge of the front-panel, a transverse rearward edge attached along the transverse upper edge of the rear-panel, and longitudinally extending lower areas attached at relatively-long intervals to the respective leg-members of the several ribs, said cover member being unattached to the spacer-member of all ribs located forwardly of the rearmost-rib.

3. The canopy combination of claim 2 wherein there is at least three arch-like ribs including at least one intermediate-rib always positioned between said rearmost-rib and the forwardmost-rib; wherein said at least three upright arch-like ribs are geometrically similar and substantially parallel to each other; wherein there is a plurality of transversely extending rollers attached to the respective lower ends of each rib, said rollers being longitudinally rollably engaged along the respective rails; wherein the rigidly upright front-panel is longitudinally adjustable with respect to the frame member; wherein there are rearwardly extending brace means adapted to apply rearward forces upon the rearmost-rib at the rearward limit of travel thereof so as to longitudinally tighten the cover member; and wherein the cover member at the respective longitudinally extending edges thereof is removably attachable at relatively-short intervals to the rails between said ribs.

4. The canopy combination of claim 3 wherein the relatively-short intervals removable attachment between the cover member and the frame member is accomplished through longitudinally extending attachment-plates adjustably positioned along the upright outward-side of the respective rail-like tracks; and wherein the plurality of transversely extending rollers attached to the respective two lower ends of each rib at each said track means includes a plurality of said rollers rollably associated along the upper surface of the two convergent lips and another plurality of rollers rollably associated along the lower surface of the two convergent lips whereby each rib is stably uprightly rollably associated along the respective two opposed track means.

5. The canopy combination of claim 1 wherein there is a transversely extending upright rigid front-panel attached to the frame-member and permanently positioned forwardly of the forwardmost-rib, said front-panel including a transversely extending upper edge at substantially co-elevation with the spacer-members of several ribs; wherein there is a transversely extending upright rigid rear-panel attached to the rearmost-rib; and wherein the cover member comprises a substantially rectangular elongate strip of flexible festonnable sheet material including: a transverse forward edge attached along the transverse upper edge of the front-panel a transverse rearward edge attached along the transverse upper edge of the rear-panel, and longitudinally extending lower areas attached at relatively-long intervals to the respective leg-members of several ribs, said cover member being unattached to the spacer-member of ribs located forwardly of said rearmost-rib.

* * * * *